(12) United States Patent
Claud

(10) Patent No.: US 11,193,531 B1
(45) Date of Patent: Dec. 7, 2021

(54) RADIAL BEARING

(71) Applicant: Eric R. Claud, Bartlett, TN (US)

(72) Inventor: Eric R. Claud, Bartlett, TN (US)

(*) Notice: Subject to any disclaimer, the term of this patent is extended or adjusted under 35 U.S.C. 154(b) by 0 days.

(21) Appl. No.: 17/018,387

(22) Filed: Sep. 11, 2020

Related U.S. Application Data

(60) Provisional application No. 62/898,597, filed on Sep. 11, 2019.

(51) Int. Cl.
*F16C 19/28* (2006.01)
*F16C 19/50* (2006.01)

(52) U.S. Cl.
CPC ............ *F16C 19/507* (2013.01); *F16C 19/28* (2013.01)

(58) Field of Classification Search
CPC ...... F16C 19/28; F16C 19/305; F16C 19/507; F16C 33/36; F16C 2326/02
See application file for complete search history.

(56) References Cited

U.S. PATENT DOCUMENTS

| | | | |
|---|---|---|---|
| 1,876,628 A * | 9/1932 | Dawe | B60S 1/68 301/52 |
| 1,964,887 A * | 7/1934 | Lovett, Jr. | B65D 85/52 47/84 |
| 4,764,036 A | 8/1988 | McPherson | |
| 5,908,247 A | 6/1999 | Leuthold et al. | |
| 10,118,439 B1 * | 11/2018 | Patrick | B60B 15/025 |
| 2019/0077188 A1 * | 3/2019 | Patrick | B60B 15/025 |

OTHER PUBLICATIONS

Stainless Steel Radial Ball Bearings. Product Listing [online]. © 2020 TRITAN [retrieved on Jun. 7, 2019]. Retrieved from the Internet: <URL: https://www.tritanpt.com/online-catalog/deep-groove/stainless-steel/>.

Radial Ball Bearings. Product Listing [online]. © 2020 TRITAN [retrieved on Jun. 7, 2019]. Retrieved from the Internet: <URL: https://www.tritanpt.com/online-catalog/deep-groove/radial-ball/>.

SkyValet | Innovative Smart Luggage with Shark Wheels. Product Listing [online]. Kickstarter, PBC © 2020 [retrieved on Jun. 7, 2019]. Retrieved from the Internet: <URL: https://www.kickstarter.com/projects/skyvalet/skyvalet-innovative-smart-luggage-with-shark-wheel>.

* cited by examiner

*Primary Examiner* — Phillip A Johnson
(74) *Attorney, Agent, or Firm* — Cramer Patent & Design, PLLC; Aaron R. Cramer

(57) ABSTRACT

A radial bearing comprises a traditional bearing having a plurality of sinusoidal shaped wheels in place of traditional spheroid bearings. The race of bearing may also comprise a sinusoidal shape.

18 Claims, 7 Drawing Sheets

RADIAL BEARING

RELATED APPLICATIONS

The present invention is a continuation of, was first described in, and claims the benefit of U.S. Provisional Application No. 62/898,597 filed Sep. 11, 2019, the entire disclosures of which are incorporated herein by reference.

FIELD OF THE INVENTION

The present invention relates generally to a bearing and more specifically to a radial bearing.

BACKGROUND OF THE INVENTION

Bearings are found in almost every mechanical machine, from small motors barely bigger than a grain of rice, all the way up to huge bearings used on the propeller shafts of the largest ocean-going vessel. While bearings serve many purposes, perhaps the most critical one is that of reducing friction. Any friction between two (2) moving surfaces results in heat and energy loss. This means that the prime mover must work harder or produce extra energy that is in turn just wasted on friction.

As one can imagine, manufacturers strive to keep such waste to a minimum thus maximizing the efficiency of their product over that of their competitors. While material science has generated some advances in recent years, most bearing today use balls and rollers that have been unchanged for hundreds of years. Accordingly, there exists a need for a means by which bearings efficiency can take a monumental step forward in the quest to reduce friction between moving mechanical parts. The development of the sinusoidal bearing element for use in bearing assemblies fulfills this need.

SUMMARY OF THE INVENTION

The principles of the present invention provide for a sinusoidal bearing element has at least one node each having a plurality of peaks separated by a plurality of valleys. The peaks and the valleys are provided with a continuous sinusoidal shape. The plane of the continuous sinusoidal shape is continuously equidistant to a rotational axis. The sinusoidal shape has a constant sinusoidal amplitude peak and a constant sinusoidal period. The at least one node has a constant sinusoidal amplitude peak and a constant sinusoidal period.

The at least one node may encircle the rotational axis and may be sinusoidally and symmetrically divergent about their common plane of symmetry. Each of the at least one node may provide for an equal fraction of the total area of contact from the at least one node which is less than the contact width of the at least one node nodes combined due to the valleys separating a plurality of adjacent nodes. Each of the at least one node may be 1 inch in length, ½ inch in width, and ½ inch in thickness. The wheel bearing assembly may be utilized in an application selected from the group consisting of an engine, a transmission, a wheel, a hub assembly, a differential, a stationary housing and mounting that are bolted to a frame, a stanchion, supporting the ends of a shaft, or supporting the ends of a conveyor roller. The sinusoidal bearing element may be a single continuous item. The sinusoidal bearing element may be made of material selected from the group consisting of chrome steel, stainless steel, ceramics, carbon steel, carbon alloy steel, or plastic. The sinusoidal bearing element may be utilized in a wheel bearing assembly having an inner race, a retainer, and an outer race.

The wheel bearing assembly may be sealed or non-sealed. The wheel bearing assembly may utilize a lubricant or without a lubricant. The sinusoidal bearing element may be utilized in a thrust bearing assembly having a thin bearing face, an element separator, and a thick bearing face. The thrust bearing assembly may be sealed or non-sealed and may utilize a lubricant. The sinusoidal bearing element may be utilized in a needle bearing assembly which has an outer ring and a cage. The needle bearing assembly may be sealed or non-sealed and may utilize a lubricant.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
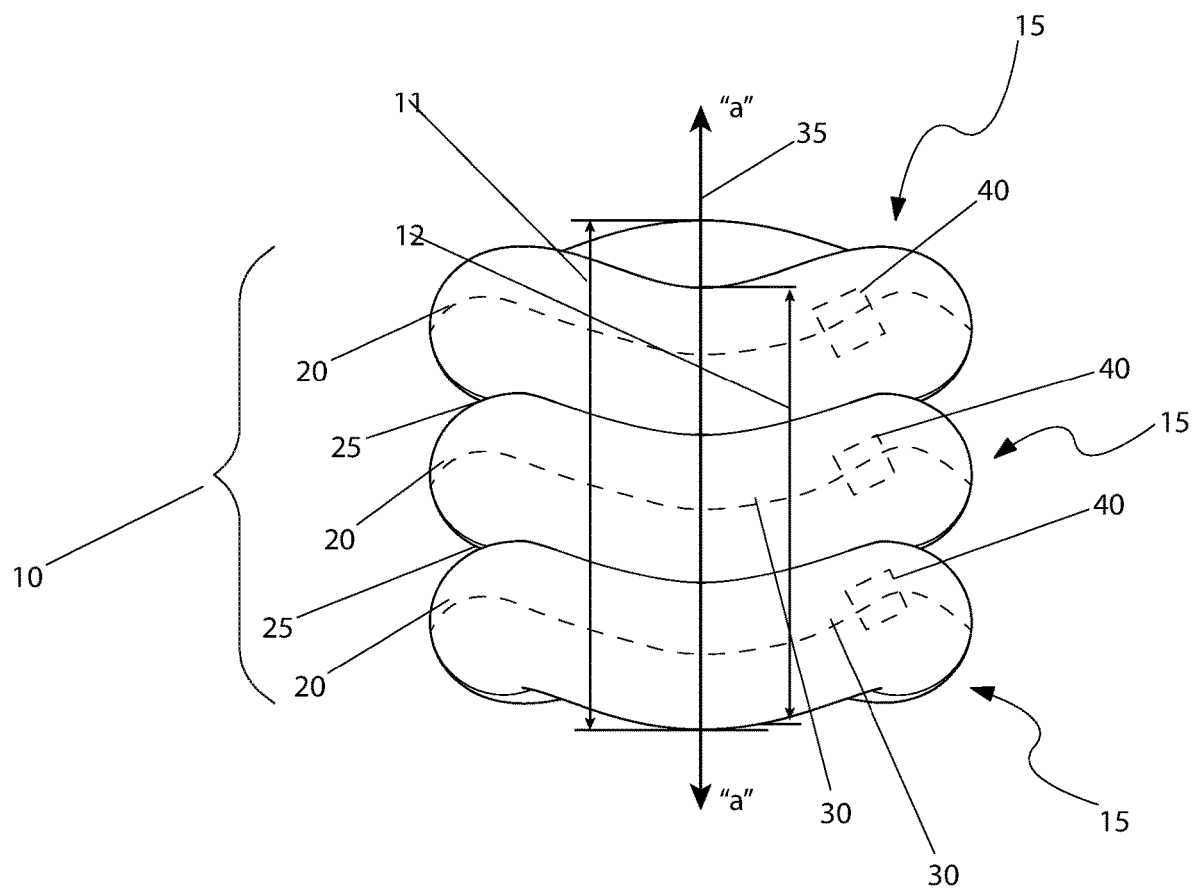
FIG. 1 is a side view of the sinusoidal bearing element, according to the preferred embodiment of the present invention.

10 sinusoidal bearing element
11 effective width
12 contact width
15 node
20 peak
25 valley
30 sinusoidal shape
35 rotational axis
40 area of contact
45 interior opening
50 wheel bearing assembly
55 inner race
60 retainer
65 outer race
70 thrust bearing assembly
75 thin bearing face
80 element separator
85 thick bearing face
90 needle bearing assembly
95 outer ring
100 cage
1. Description of the Invention The best mode for carrying out the invention is presented in terms of its preferred embodiment, herein depicted within FIG. 1 through 4. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

2. Detailed Description of the Figures

Referring now to FIG. 1, a side view of the sinusoidal bearing element 10, according to the preferred embodiment of the present invention is disclosed. The sinusoidal bearing element 10 (herein also described as the "element") 10, includes a single continuous item shaped as shown. The element 10 would presumably be made of chrome steel for most applications. However, the teachings of the present invention allow for manufacture from other materials such as stainless steel, ceramics, carbon steel, carbon alloy steel, plastics and the like may also be utilized depending on the bearing application. As such, the use of any specific material of the construction of the element 10 is not intended to be a limiting factor of the present invention.

Figure 3:
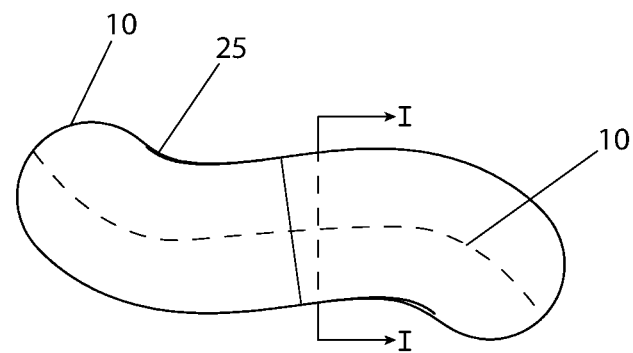
FIG. 3 is a side view of an individual node, according to the preferred embodiment of the present invention.
Figure 4:
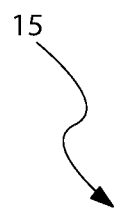
FIG. 4 is a cross-sectional view of an individual node taken along the line I-I (see FIG. 3), according to the preferred embodiment of the present invention.
Figure 4:
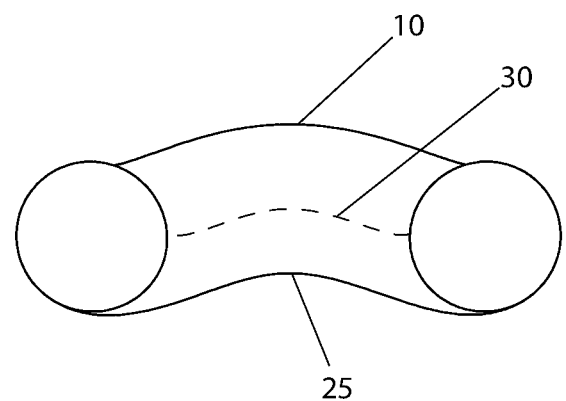

The sinusoidal bearing element for use in bearing assemblies 10 has at least one (1) node 15, with preferably three (3) (as shown) or more. FIGS. 3 and 4 illustrate an individual node 15. Each node 15 is comprised of a set of peaks 20 separated by a set of valleys 25. Both the peaks 20 and the valleys 25 are provided with a continuous sinusoidal shape 30 (herein depicted by a dashed line). The sinusoidal shape 30 has a constant sinusoidal amplitude peak and a constant sinusoidal period. Multiple nodes 15 (if provided) possess the same constant sinusoidal amplitude peak and constant sinusoidal period. The multiple nodes 15 (if provided) encircle the same axis of rotation, wherein said nodes 15 are sinusoidally and symmetrically divergent about their common plane of symmetry. It is envisioned that the bearing assembly in which the element 10 is utilized will operate at lower temperatures due to the fact that the area of contact 40 at any given moment is recued compared to the full effective width 11 of the element 10. Additionally, each node 15 provides for an equal fraction of the total area of contact 40 which is less than the contact width 12 of the nodes 15 combined due to the valleys 25 separating adjacent nodes 15. In an exemplary embodiment, each node 15 can have dimensions as little as one inch (1 in.) in length, one-half inch (½ in.) in width, and one-half inch (½ in.) in thickness.

Figure 2:
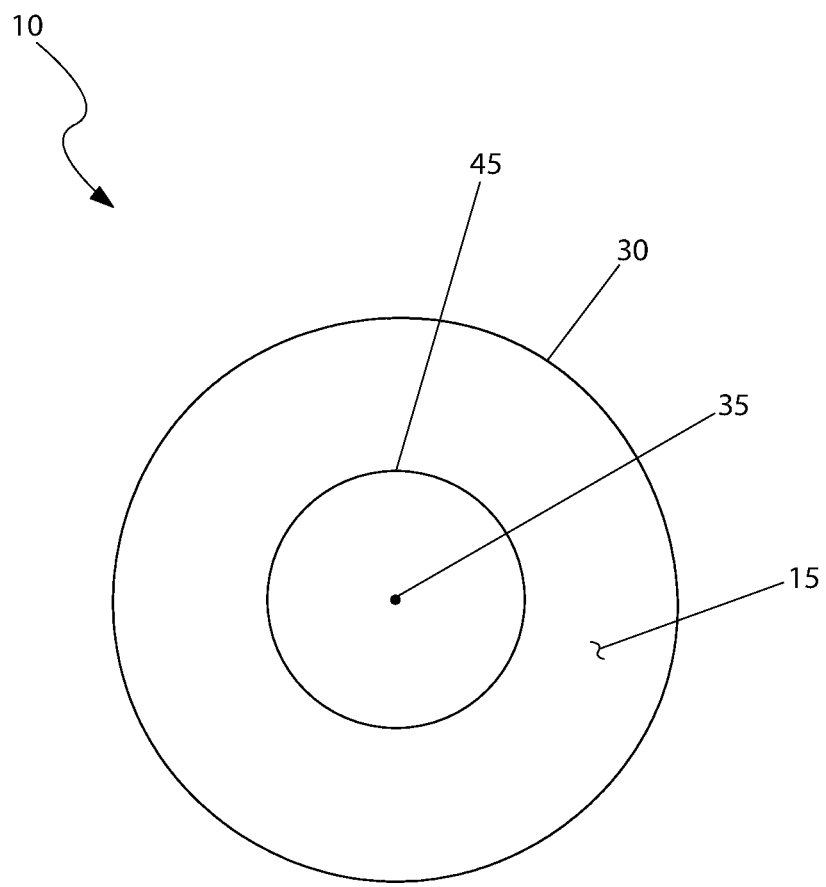
FIG. 2 is an end view of the sinusoidal bearing element, according to the preferred embodiment of the present invention.

Referring next to FIG. 2, an end view of the element 10, according to the preferred embodiment of the present invention is depicted. The end view provides disclosure on the end face of the node 15. The viewed face is perfectly circular in appearance, as the plane of the sinusoidal shape 30 is continuously equidistant to the rotational axis 35. This view would also be typical for any cross-section point taken perpendicular along the rotational axis 35 as well. The element 10 may or may not be provided with a node 15 such as for forming an axle, bore, or even its own sinusoidal bearing surface. The presence or lack of an interior opening 45 shall not be interpreted as a limiting factor of the present invention. The circular presentation provided by this end view provides for rotational functionality and a one-for-one replacement of bearing assemblies utilizing the element 10 in existing mechanical devices.

Figure 5:
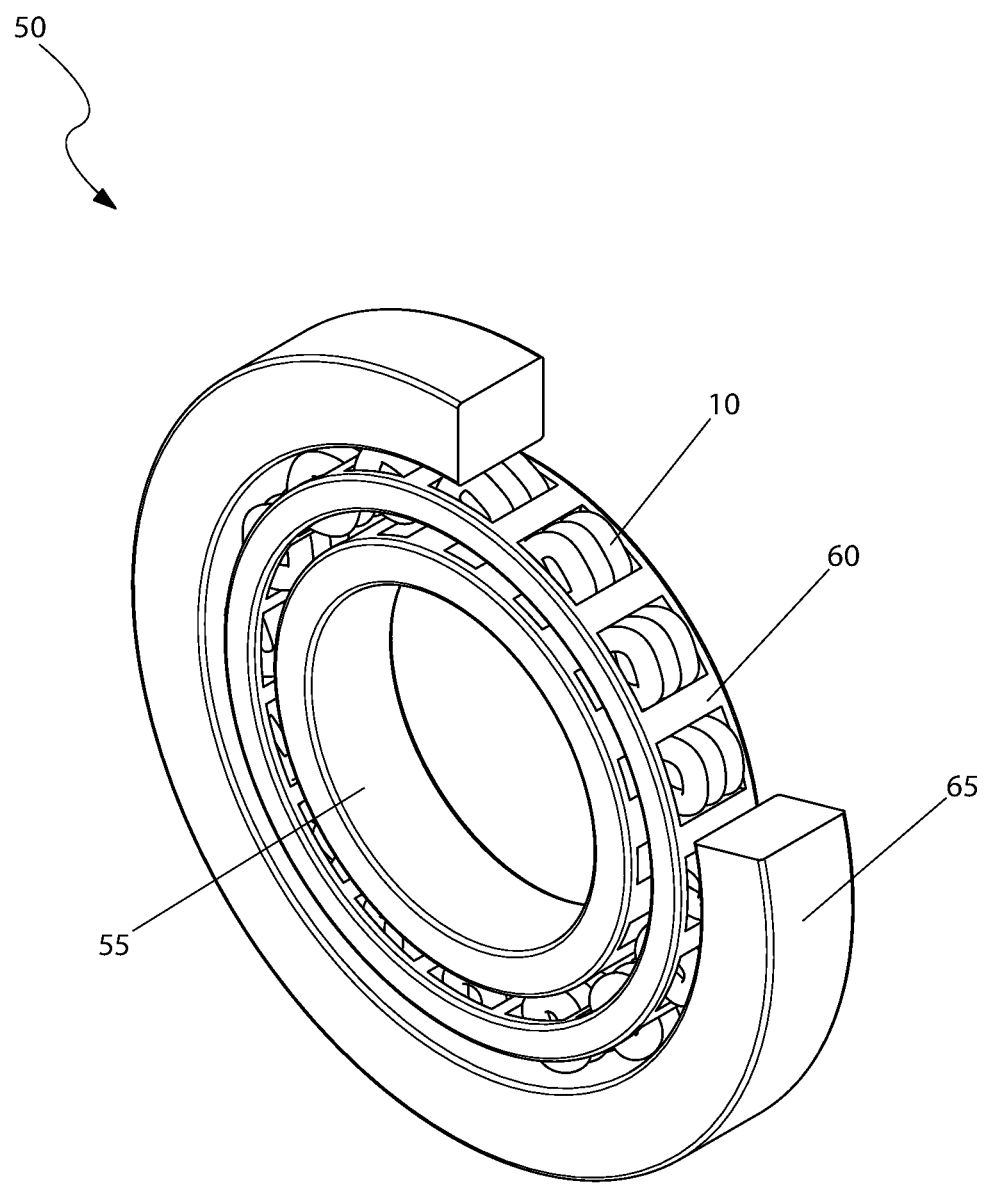
FIG. 5 is an isometric view of a wheel bearing assembly, utilizing the sinusoidal bearing element, according to the preferred embodiment of the present invention.

Referring now to FIG. 5, an isometric view of a wheel bearing assembly 50, utilizing the element 10, according to the preferred embodiment of the present invention is shown. The wheel bearing assembly 50 is intended as a representative depiction of a conventional, common bearing. It is not intended to depict all variations, sizes, configurations, and permutations. The wheel bearing assembly 50 would be scalable in size for use in small, hand-held machines, up to the largest bearings such as those used on prime motion devices of the world's largest machines. As expected, the wheel bearing assembly 50 provides at a minimum, an inner race 55, a retainer 60, and an outer race 65 (the outer race 65 is depicted in a partially cutaway view to illustrate critical construction principals). However, in lieu of standard. ball bearings, cylindrical roller, spherical, tapered, single row and double bearings, an element 10 is used in their place. The design of the element 10 would obviously be highly dependent on load factors, environmental conditions, contaminants, speed rating, and the like. The wheel bearing assembly 50 may be sealed or non-sealed and may utilize different types of lubricants or no lubricant at all. In its disclosed configuration, the wheel bearing assembly 50 may be a direct replacement or will be installed new in various applications that require anti-friction devices, such as engines, transmissions, wheels, hub assemblies, differentials, etc. In continuance with the highly dependent but universal applications addressed by the element 10, the wheel bearing assembly 50 may be used in stationary housings, and mountings that, in turn, are bolted to frames, stanchions, etc., and are used for supporting the ends of shafts, conveyor rollers, and the like.

Figure 6:
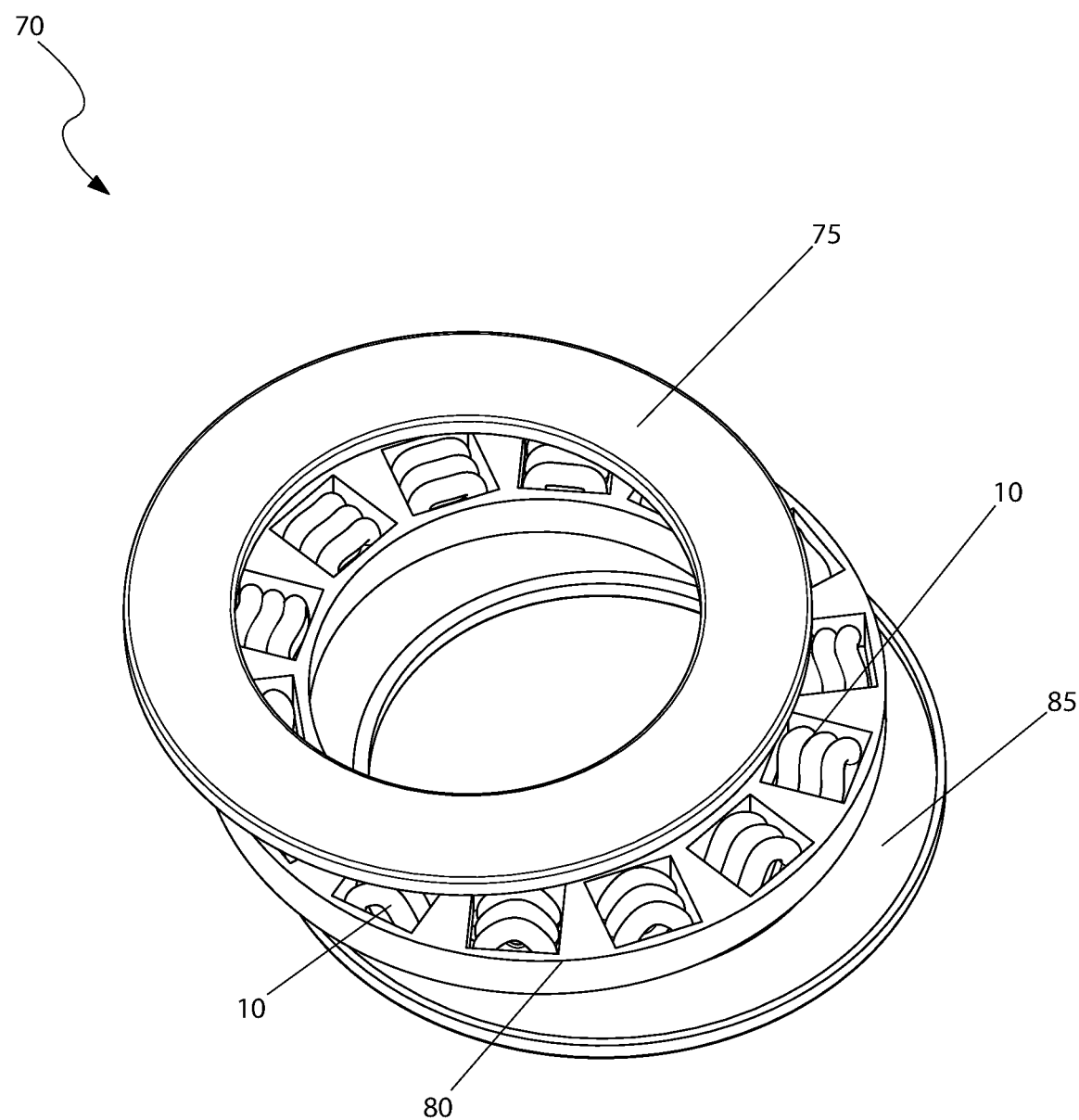
FIG. 6 is an isometric view of a thrust bearing assembly, utilizing the sinusoidal bearing element, according to the preferred embodiment of the present invention.

Referring next to FIG. 6, an isometric view of a thrust bearing assembly 70, utilizing the element 10, according to the preferred embodiment of the present invention is disclosed. The thrust bearing assembly 70 is intended as a representative depiction of a conventional, common thrust bearing. It is not intended to depict all variations, sizes, configurations, and permutations. The thrust bearing assembly 70 would be scalable in size for use in small, hand-held machines, up to the largest bearings such as those used on prime motion devices of the world's largest machines. As expected, the thrust bearing assembly 70 provides at a minimum, a thin bearing face 75, an element separator 80, and a thick bearing face 85. However, in lieu of standard. ball bearings, cylindrical roller, spherical, tapered, single row and double bearings, an element 10 is used in their place. The design of the element 10 would obviously be highly dependent on load factors, environmental conditions, contaminants, speed rating, and the like. The thrust bearing assembly 70 may be sealed or non-sealed and may utilize different types of lubricants or no lubricant at all.

Figure 7:
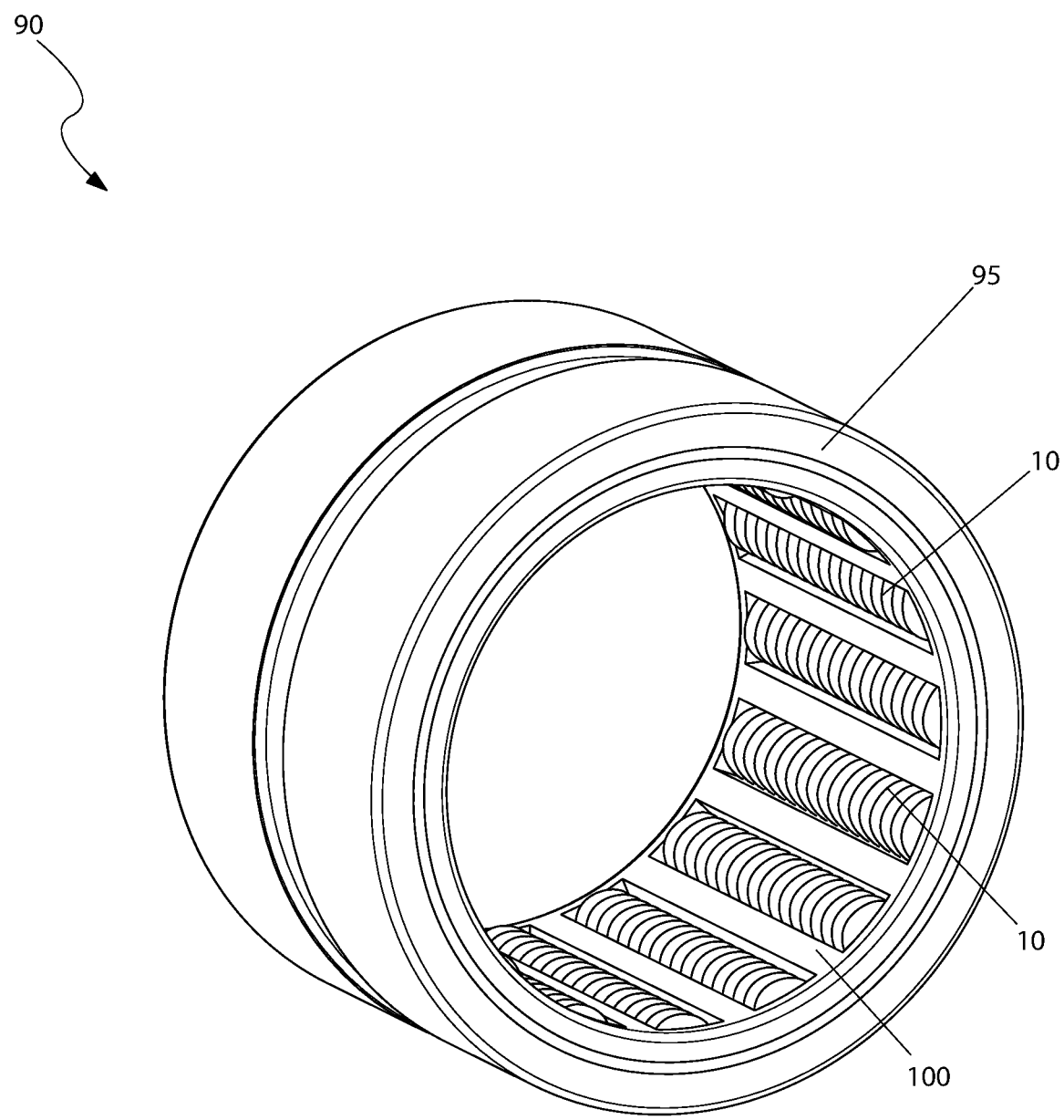
FIG. 7 is an isometric view of a needle bearing assembly, utilizing the sinusoidal bearing element, according to the preferred embodiment of the present invention.

Referring to FIG. 7, an isometric view of a needle bearing assembly 90, utilizing the element 10, according to the preferred embodiment of the present invention is depicted. The needle bearing assembly 90 is intended as a representative depiction of a conventional, common needle bearing. It is not intended to depict all variations, sizes, configurations, and permutations. The needle bearing assembly 90 would be scalable in size for use in small, hand-held machines, up to the largest bearings with internal diameters measured in feet. As expected, the needle bearing assembly 90 provides at a minimum, an outer ring 95, and a cage 100. However, in lieu of standard. ball bearings, cylindrical roller, spherical, tapered, single row and double bearings, an element 10 is used in their place. The design of the element 10 would obviously be highly dependent on load factors, environmental conditions, contaminants, speed rating, and the like. The needle bearing assembly 90 may be sealed or non-sealed and may utilize different types of lubricants or no lubricant at all. It is noted that the element 10 as used with the needle bearing assembly 90 may have many nodes 15 (as seen in FIG. 1) dependent upon the overall length of said element 10 versus its diameter.

3. Operation of the Preferred Embodiment

The preferred embodiment of the present invention can be utilized by the common user in a simple and effortless manner with little or no training. It is envisioned that the element 10 would be constructed in general accordance with FIG. 1 through FIG. 4. The user would procure the element 10 in a respective bearing assembly such as those depicted in FIG. 5, 6, or 7. Special attention would be paid to the application in which the element 10 is to be used. As with any bearing, the skills of an engineering discipline may be necessary to determine optimum performance and life cycle issue. The element 10 would be procured from conventional sources such as supply houses, parts depot, mail order and internet supply houses or the like.

After procurement the respective bearing assembly would be installed and utilized like its conventional current counterparts. As previously described, lubrication may or may not be used. Once installed, the operation of the element 10 is transparent to the end user.

The use of the element 10 is envisioned to provide the following benefits: overall friction imposed by the bearing assembly using the element 10 is decreased, a reduced contact area from the element 10 is provided, thus reducing friction and wasted energy, reduced axial friction, alternating pattern of peaks 20 and valleys 25 generated by the sinusoidal shape 30 channels any contaminants out of the way, allows for smoother operation for longer periods of time, decreased rolling resistance and sliding friction, a longer useful life of up to fifteen percent (15%), a speed advantage of up to fifteen percent (15%), and a rebound advantage of up to fifteen percent (15%).

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A sinusoidal bearing element, comprising:
    at least one node each having a plurality of peaks separated by a plurality of valleys, the peaks and the valleys are provided with a continuous sinusoidal shape, the plane of the continuous sinusoidal shape is continuously equidistant to a rotational axis;
    wherein the sinusoidal shape has a constant sinusoidal amplitude peak and a constant sinusoidal period;
    wherein the at least one node has a constant sinusoidal amplitude peak and a constant sinusoidal period;
    wherein the at least one node encircles the rotational axis and is sinusoidally and symmetrically divergent about their common plane of symmetry of the at least one node; and
    wherein the sinusoidal bearing element includes a thrust bearing assembly having a thin bearing face, an element separator, and a thick bearing face.

2. The sinusoidal bearing element, according to claim 1, wherein the at least one node includes a plurality of nodes, each of the nodes provides for an equal fraction of a total area of contact of the nodes, wherein the equal fraction of the total area of contact is less than the contact width of the nodes combined due to the valleys separating at least one adjacent nodes.

3. The sinusoidal bearing element, according to claim 1, wherein the at least one node is 1 inch in length, ½ inch in width, and ½ inch in thickness.

4. The sinusoidal bearing element, according to claim 1, wherein a wheel bearing assembly is utilized in an application selected from the group consisting of an engine, a transmission, a wheel, a hub assembly, a differential, a stationary housing and mounting that are bolted to a frame, a stanchion, supporting the ends of a shaft, or supporting the ends of a conveyor roller.

5. The sinusoidal bearing element, according to claim 1, wherein the sinusoidal bearing element is a single continuous item.

6. The sinusoidal bearing element, according to claim 1, wherein the sinusoidal bearing element is made of material selected from the group consisting of chrome steel, stainless steel, ceramics, carbon steel, carbon alloy steel, or plastic.

7. The sinusoidal bearing element, according to claim 1, wherein the sinusoidal bearing element is utilized in a wheel bearing assembly having an inner race, a retainer, and an outer race.

8. The sinusoidal bearing element, according to claim 7, wherein the wheel bearing assembly is sealed.

9. The sinusoidal bearing element, according to claim 7, wherein the wheel bearing assembly is non-sealed.

10. The sinusoidal bearing element, according to claim 7, wherein the wheel bearing assembly utilizes a lubricant.

11. The sinusoidal bearing element, according to claim 7, wherein the wheel bearing assembly is without a lubricant.

12. The sinusoidal bearing element, according to claim 1, wherein the thrust bearing assembly is sealed.

13. The sinusoidal bearing element, according to claim 1, wherein the thrust bearing assembly is non-sealed.

14. The sinusoidal bearing element, according to claim 1, wherein the thrust bearing assembly utilizes a lubricant.

15. The sinusoidal bearing element, according to claim 1, wherein the sinusoidal bearing element is utilized in a needle bearing assembly having an outer ring and a cage.

16. The sinusoidal bearing element, according to claim 15, wherein the needle bearing assembly is sealed.

17. The sinusoidal bearing element, according to claim 15, wherein the needle bearing assembly is non-sealed.

18. The sinusoidal bearing element, according to claim 15, wherein the needle bearing assembly utilizes a lubricant.

\* \* \* \* \*